INVENTOR.
WILLIAM F. KRENZKE
BY
*A. S. Krob*
ATTORNEY

July 27, 1943. W. F. KRENZKE 2,325,252
TRACTOR MOUNTED AND CONTROLLED GANG LAWN MOWER
Filed Feb. 9, 1942 6 Sheets-Sheet 4

INVENTOR.
WILLIAM F. KRENZKE
BY
A.S.Krob
ATTORNEY

July 27, 1943.  W. F. KRENZKE  2,325,252
TRACTOR MOUNTED AND CONTROLLED GANG LAWN MOWER
Filed Feb. 9, 1942  6 Sheets-Sheet 5

INVENTOR.
WILLIAM F. KRENZKE
BY
A.S.Kroh
ATTORNEY

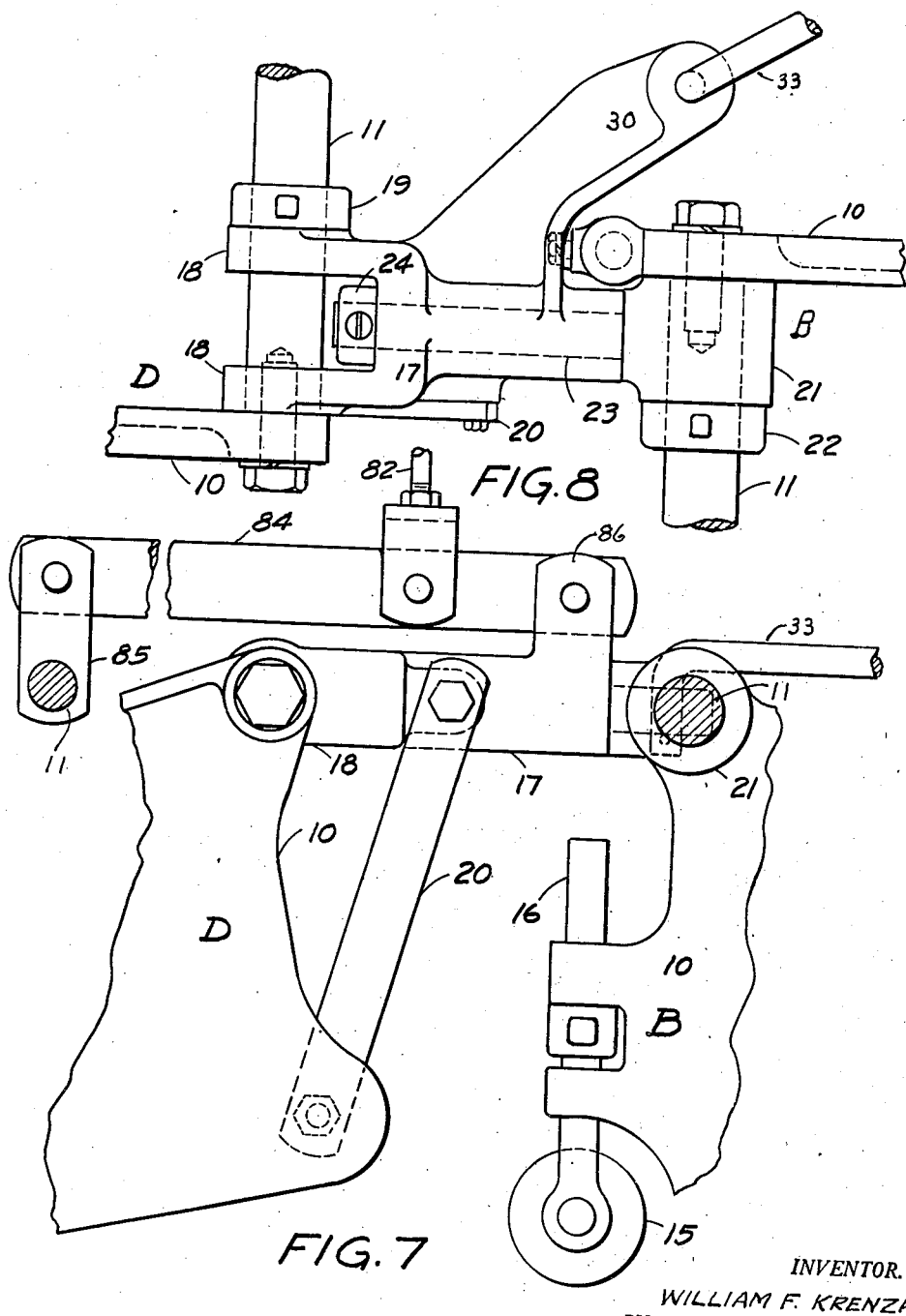

Patented July 27, 1943

2,325,252

UNITED STATES PATENT OFFICE 2,325,252

TRACTOR MOUNTED AND CONTROLLED GANG LAWN MOWER

William F. Krenzke, Racine, Wis., assignor to Jacobsen Manufacturing Company, Racine, Wis., a company of Wisconsin Application February 9, 1942, Serial No. 430,036

7 Claims. (Cl. 56—7)

The present invention relates to direct coupled lawn mower units and is an improvement over the design disclosed in my application Serial No. 366,998, filed November 25, 1940.

A principal object of the present invention is to provide an improved power lifting means for the mower units.

A further object of the present invention is to provide means whereby the mower units are permitted to move freely over uneven ground surfaces but are held from side swinging relative to the tractor.

Another object of my invention is to provide means whereby the three mower units may be raised and lowered by means of a power lifting device whereby the outer ends of the outside units lift higher than the remainder of the units and whereby means are provided which automatically disconnect the power connections when the units are lifted from their operating positions.

To these and other useful ends, my invention consists of parts, combinations of parts, or their equivalents, and mode of operation, as hereinafter set forth and claimed and shown in the accompanying drawings in which:

Figures 7 and 8 are enlarged views of the hinged connection between the rear and the front mower units.

Figure 1:
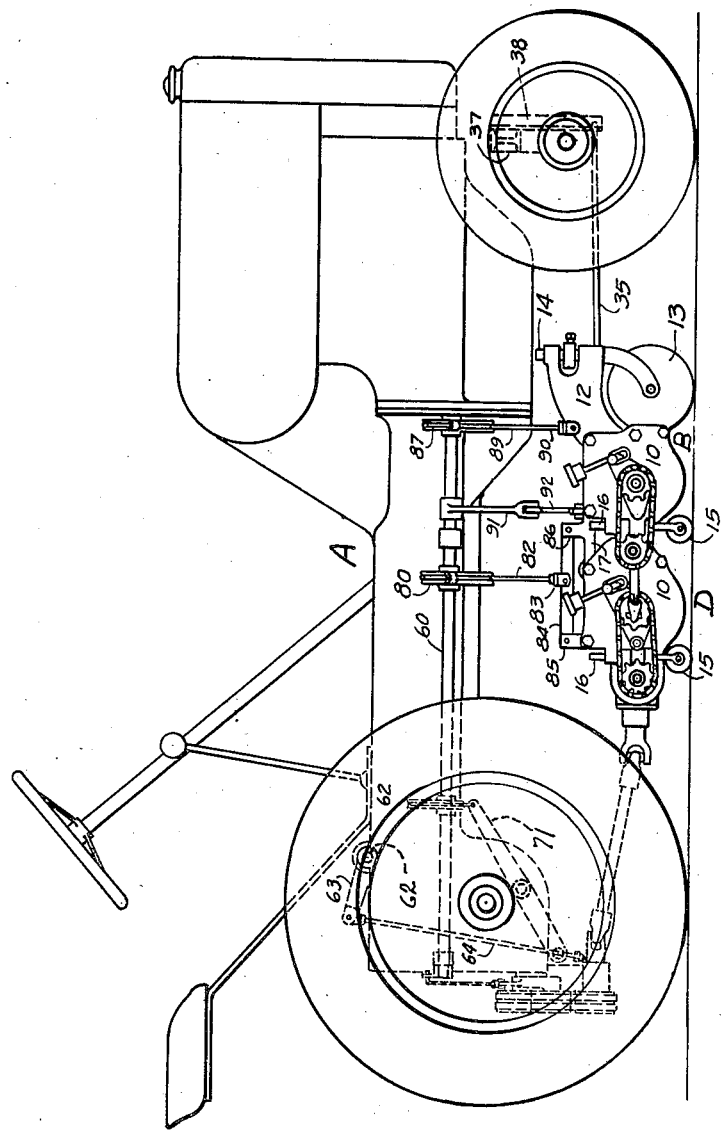
Fig. 1 is a side elevational view of my device as attached to a conventional tractor, the near driving wheel being removed.

As thus illustrated, I have designated the tractor in its entirety by reference character A. The right and left hand mower units are designated by reference characters B and C respectively and the rear mower unit in its entirety is designated by reference character D.

Figure 2:
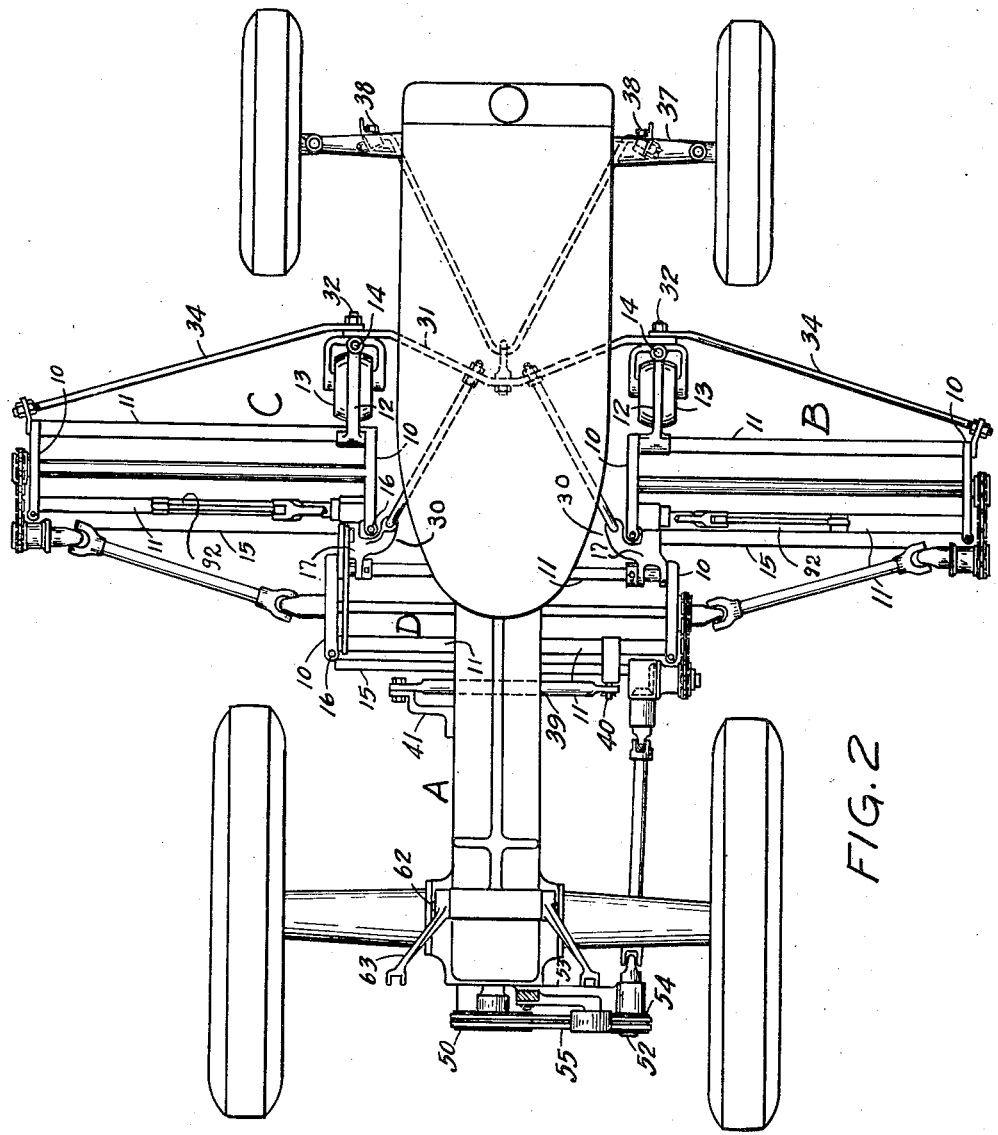
Fig. 2 is a top view of the device illustrated in Figure 1, the front and rear hitches being shown partially by dotted lines.

Tractor A may be of any conventional design, preferably the design shown in the figures, having two rear driving wheels and two front guiding wheels mounted on a front axle. The mower units are preferably located under the tractor as illustrated in Figures 1 and 2 and are attached to the front axle by means of draw bars which may be connected directly to the tractor frame. For example, when the front wheels are closely spaced and are mounted on a caster axle or when the mower units are positioned in rear of the tractor.

My invention contemplates the use of tractors having a power take-off shaft which protrudes at the rear end of the tractor frame preferably as shown in Figures 1, 2, 4 and 5 as will hereinafter appear.

The three mower units B, C and D each comprise end frame members 10 and upper front and rear connecting bars 11. Mower units B and C are, at their inner corners supplied with upwardly and forwardly extending arms 12—12 upon which castered wheels 13—13 are mounted on vertically mounted spindles 14—14, the rear ends of the three units each being provided with preferably rubber carrying rollers 15. These carrying rollers are rotatably mounted at their ends on standards 16 which are vertically slidably mounted in suitable ears forming a part of end members 10 and being held in their vertical adjustment preferably by means of set screw collars (not shown) which are positioned between the ears.

Provision is made for carrying the front end of the rear unit D on the inner rear corners of units B and C as follows:

Front connecting bar 11 of unit D is provided with brackets 17 having at their rear ends spaced ears 18 which are rotatably mounted on members 11 and being held into position by collars 19. Brackets 17 are preferably anchored to rear members 10 by means of braces 20—20.

I hingedly mount brackets 21 on rear bars 10 of units B and C, these brackets being held into position by means of collars 22. Bracket 21 is provided with trunnions 23 which are rotatably mounted in brackets 17 and being held into position by means of collars 24. It will be seen that the front end of unit D will be carried by the inner rear corners of units B and C, that this connection permits unit D to raise and lower on rear bars 10 as an axis and that unit D, because of trunnions 23 will be free to float over uneven ground independent of units B and C and that all three of the mower units will be permitted to travel freely over uneven ground and cut an even stubble because of rollers 15 and castered wheels 13.

Figure 6:
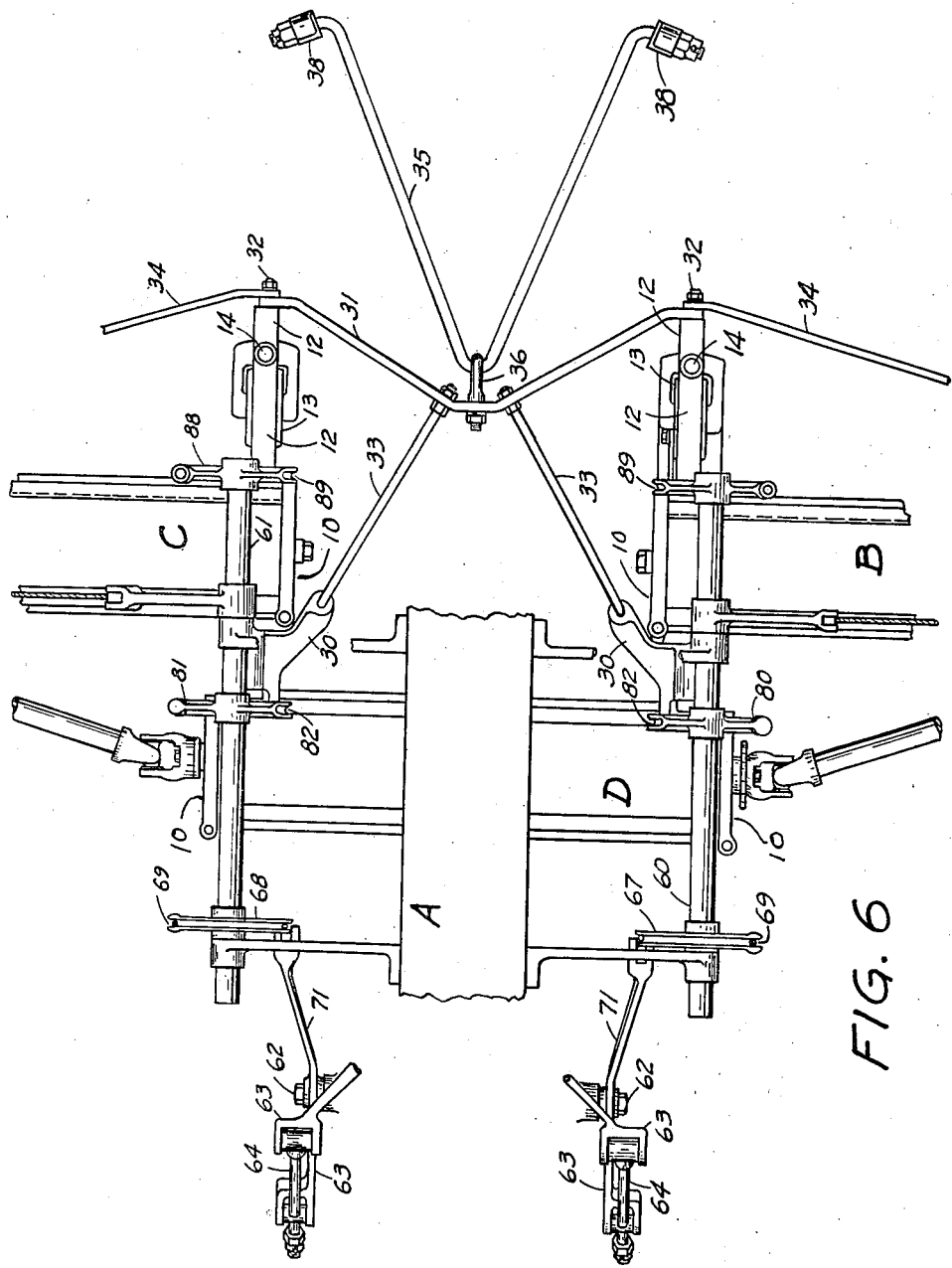
Fig. 6 is a fractional top view of the device.

I provide means for longitudinally pivotally conecting units B and C together in spaced relation as follows:

Brackets 17 are each provided with inwardly extending brackets 30. I provide a bar 31, the ends of which are pivotally mounted to members 12 as at 32. Bar 31 converges inwardly and rearwardly as illustrated in Figure 6 so as to give length to the draw bar and having connections to members 30 by means of rods 33. Members 30 and 33 cooperate with members 17, 21 and 32 to permit individual movement of the three mower units over uneven ground. Member 31, being of substantial strength, may be considered as hingedly spacing members 12.

In order to provide a more rigid structure, I provide brace members 34 which form spacing connections between the outer ends of members B and C and the front ends of members 12.

It is desired to prevent side movement of the front of the mower units. For this purpose, I provide a V-shaped hitch member 35, the rear end being curved as shown. This curved end is secured to member 31 by means of an eye-bolt 36.

The front ends of members 35 are pivotally mounted to the front axle 37 of the tractor in any convenient manner; thus it will be seen that the mower units will be pulled by means of eye-bolt 36 which is secured to member 31 midway its length but that member 36 will not be permitted to move transversely to the tractor frame.

In Figures 1, 2 and 6 I illustrate one form of connection between draw bar 35 and front axle 37 wherein posts 38—38 are provided and draw bar members 35 are bent outwardly and rearwardly and extending loosely through apertures in the bottom ends of members 38, these members depending from axle 37 and being secured thereto in any suitable manner.

It will be understood that the front ends of draw bars 35 may be hingedly secured to the front end of the tractor frame or to any other part of the tractor.

Since the mower assembly is long and longitudinally relatively short, eye-bolt 36 would permit the rear ends of the units to swing sidewise. I provide a stabilizing link 39 which is positioned nearly horizontal, one end being hingedly secured to the rear bar 11 of unit D as at 40 and the other end being hingedly anchored to the tractor frame by means of a bracket 41. Thus it will be seen that the rear end of unit D is free to move vertically over uneven ground or to lift to an inoperating position but it cannot move transversely, therefore the entire mower assembly is held directly under the tractor and turns to the right or left with the tractor.

Figure 3:
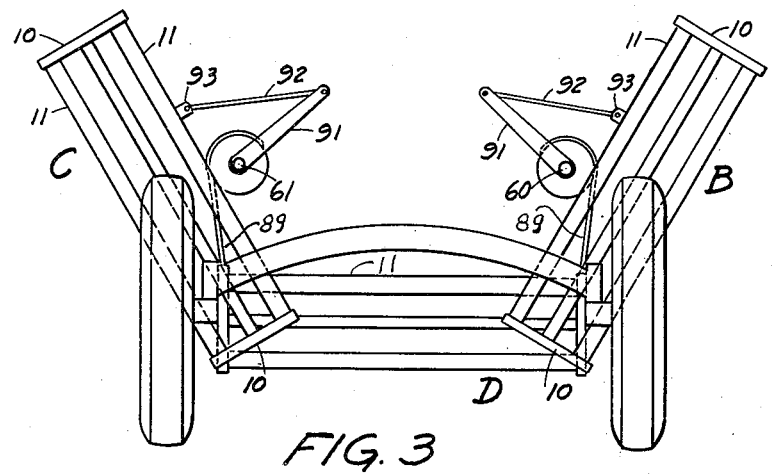
Fig. 3 is a rear end view of the device shown in Figures 1 and 2 illustrating the gang units diagramatically in lifted positions.

I provide means for driving the rotors of members B, C and D from the power take-off of the tractor as follows:

One or more V pulleys 50 (see Figures 4 and 5) are secured to the protruding end 51 of the power take-off shaft of the tractor. A short countershaft 52 is rotatably mounted on a bracket 53 (see Figure 2) which is secured to the rear end of the tractor. I mount one or more V pulleys 54 on the rear end of shaft 52 and operatively connect pulleys 50 and 54 by means of one or more V belts 55. Normally belts 55 are made somewhat longer than necessary so unless tightened by means of an idler pulley, the belts will slip. These belts are provided with tightening means when the mowers are in their operating position as in Figure 4 but means are provided for loosening the belt when the mowers are in their lifted position as shown in Figure 3.

The operating connections between shaft 52 and the mower units are substantially as shown in the figures or as shown in my application Serial No. 366,998, filed November 25, 1940.

Referring specifically to Figures 1 and 3 through 6. I rotatably mount on opposite sides of the tractor frame shafts 60 and 61 in any convenient manner and in about the position shown in Figure 5. Tractor A is provided preferably with a hydraulic lifting device having a shaft 62 (see Figures 1 and 2) the ends protruding on opposite sides of the frame of the tractor. Levers 63—63 are secured to the protruding ends of shaft 62 and positioned so their rear ends may be raised and lowered when the hydraulic mechanism of the device is operated.

The rear ends of levers 63 are each provided with hingedly mounted depending rods 64, their lower ends being provided with a nut or collar 65. Shafts 60 and 61 are provided with sheave pulleys 67 and 68 each being provided with a belt or cable 69 which is anchored to the sheaves as at 70—70 (see Figure 5) the other end terminating suitable for connection to the front end of right and left hand levers 71—71 as at 72.

Levers 71 are hingedly mounted intermediate their length to the frame of the tractor as at 73. The rear ends of levers 71 are preferably forked as at 74 and having rotatably mounted therein members 75 each having apertures for the slidable reception of rods 64.

When arms 63 lift at their rear ends, nuts 65 will be brought in contact with members 75 and then a further movement of levers 63 will cause shafts 60 and 61 to turn in the direction indicated by curvilinear arrows; thus by manipulating the power lift, shafts 60 and 61 may be turned clockwise or counterclockwise.

Referring now specifically to Figures 1 and 6. Shafts 60 and 61 are provided with sheave pulleys 80 and 81, each having a cable 82 which is anchored at one end to the sheave, the lower end having brackets 83 which may either be secured to end members 10 of unit D or to a bar 84 which is anchored to unit D at its rear end as at 85 and to brackets 17 by means of ears 86.

Two other sheaves 87 and 88 are mounted on shafts 60 and 61, each having a cable 89 which is preferably anchored at its free end to members 12 as at 90. Preferably levers 91 are secured to shafts 60 and 61 in a position so when the units are lifted to their highest position, these levers will be in the position shown in Figure 3, each lever having a cable connection 92 from its outer end to units B and C as at 93.

Figure 5:
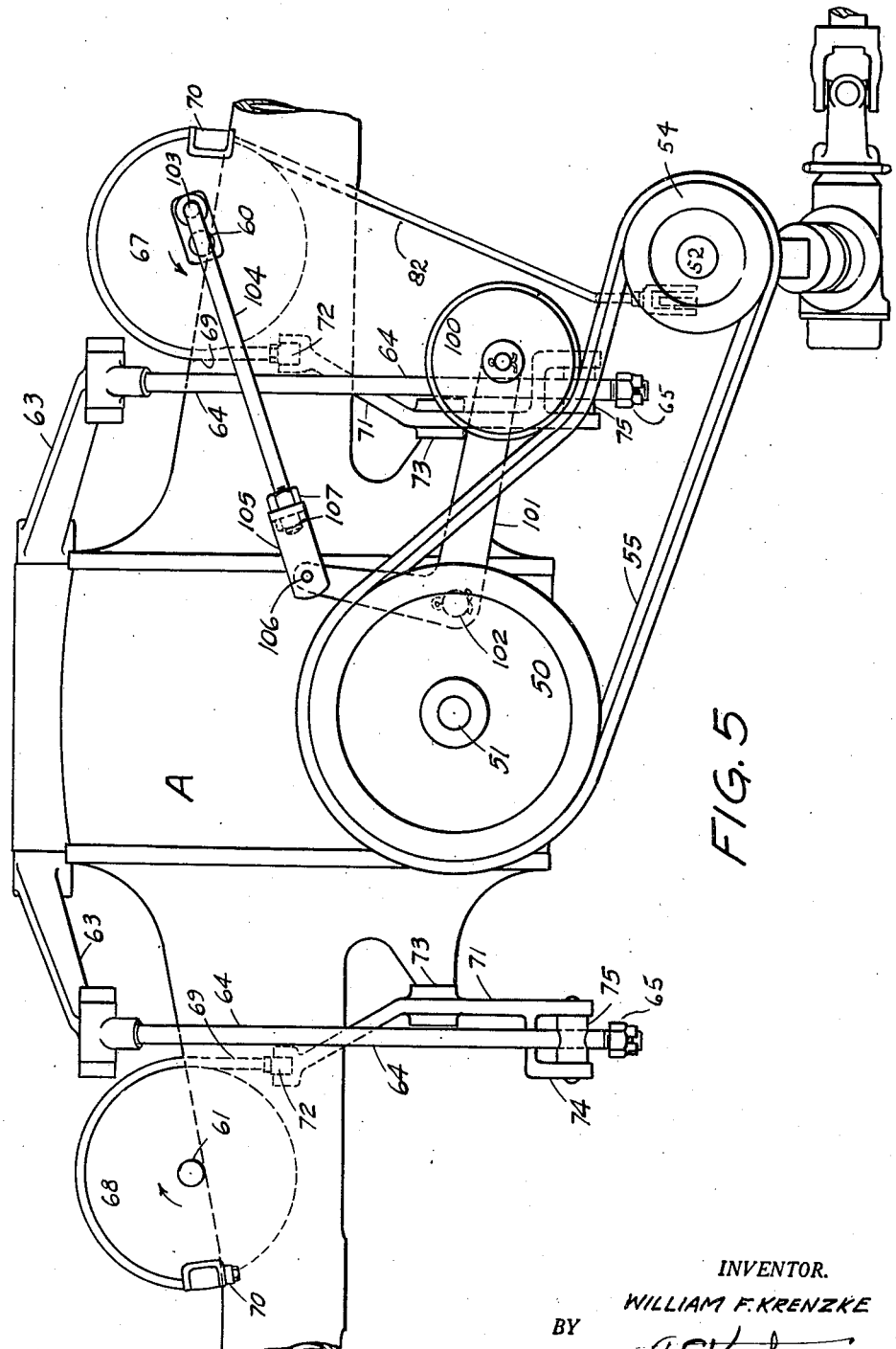
Fig. 5 is a fractional rear view of the device showing the power lift connections to the lifting shafts and the power transmitting device operatively connected to one of the lifting shafts.

Clearly when shafts 60 and 61 are turned far enough in the direction shown by curvilinear arrow in Figure 5, cables 82, 89 and 92 will lift the units to the position shown in Figure 3.

Figure 4:
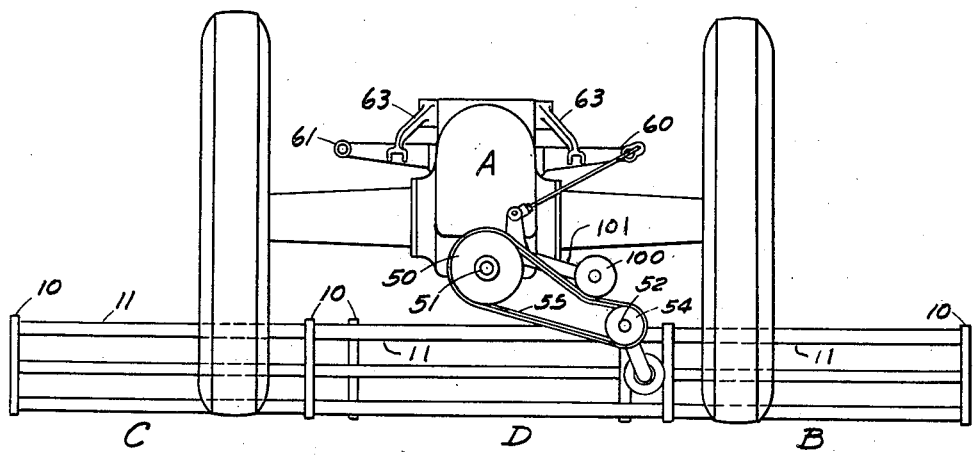
Fig. 4 is a view similar to Figure 3 showing the gangs diagramatically in their operating positions.

In Figure 4, it will be noted that an idler pulley 100 is positioned so as to tighten belts 55. This pulley is mounted on a bell crank 101 (see Figure 5) which is pivoted to the frame of the tractor as at 102. Lifting shaft 60 is provided with a crank 103. A rod 104 rotatably engages crank 103 at its outer end and is provided at the other end with a bracket 105, the bracket being pivotally secured to the upper end of the bell crank as at 106 and adjustably secured to shaft 104 by means of nuts 107.

When shaft 60 is in the position shown in Figure 5, the mower units will be resting on the ground and crank 103 will be about in the position shown. When shaft 60 turns for lifting the mower units, crank 103 will turn bell crank 101 so as to raise idler pulley 100 and loosen belts 55.

Nuts 107 may be adjusted to the point where the belt is tight enough so when the mowers are in operating position, they drive the mowers without slippage and crank 103 is far enough from the axis of shaft 60 so when the units are lifted far enough from the ground, pulley 100 will be raised far enough to allow the belt to slip.

It will be seen that the mower units may be allowed to float freely over the ground, that their rotors will be driven by the power take-off shaft of the tractor when on the ground, that they cannot move transverse to the tractor and that they may be raised at will by the power lift of the tractor.

The manner of vertically adjusting castered wheels 13 and carrying rollers 15 is too well known to require description. These adjustments are necessary in order to make the height of stubble optional.

Cables 82 and 89 are attached to the units so they will remain in nearly the longitudinal position, when lifted, they are in when on the ground. The normal operating position of nuts 65 relative to members 75 permits free vertical movement of the units.

It will be seen that it is a comparatively easy matter to disconnect the units from the tractor; in other words, to disconnect draw member 35 and the stabilizing member 39 and that it will also be a comparatively simple matter to disconnect the power operating connection from the power take-off to the units and if it is desired to use the power lift for some other purpose, it is a comparatively easy matter to disconnect all or some of the parts forming the operating connection from the power lift to shafts 60 and 61.

Having thus shown and described my invention, I claim:

1. A device of the class described, comprising a tractor having front and rear wheels, two front and a rear mower unit positioned under the frame of said tractor and between the front and rear wheels, said front units being spaced transverse to the direction of travel, the rear unit being positioned in rear of the front units and adapted to pass over the space between the front units, a spacer element, its ends having hinged connections to the front units, draw bars flexibly connected to said spacing element midway its width, the draw bars diverging forwardly with their front ends flexibly connected to the front axle of said tractor, the rear inner ends of said front units and the front outer corners of said rear unit being flexibly connected together whereby the front of the rear unit is carried by the front units, each said units having rear carrying means, castered carrying wheels secured to the front inner corners of the front units.

2. A device as recited in claim 1 including; a transversely positioned guiding link, one end being flexibly secured to said rear unit, the other end being flexibly connected to an anchor which is secured to the frame of the tractor.

3. A device as recited in claim 1 including; an operating connection between said tractor and said rear mower unit, operating connections between said rear unit and the front units.

4. A device of the class described, comprising a tractor having front and rear carrying wheels, two front and a rear mower unit positioned under the frame of said tractor and between the front and rear wheels thereof, said front units being spaced transverse to the direction of travel, the rear unit being adapted to pass over the space between the front units, a spacer element, its ends having hinged connections to said front units, a draw bar flexibly connected at its rear end to said spacing element midway its width, the draw bar being transversely hinged to the front end of said tractor for free vertical movement of said spacer element, each said units having rear carrying means, the rear inner ends of said front units and the front outer corners of said rear unit being flexibly connected together whereby the front of the rear unit is carried by the rear of said front units, castered carrying wheels secured to the front inner corners of said front units, an operating connection between said tractor and said rear unit, operating connections between said rear unit and the front units.

5. A device of the class described, comprising a tractor having front and rear carrying wheels, two front and a rear mower unit flexibly connected together and being mounted under the frame of the tractor, a draw connection between the front of said units and the front of the tractor, means on said draw connection whereby the front ends of the units cannot move sidewise relative to the tractor but will be free to move over uneven ground independent of the tractor, means connecting said rear mower unit and the frame of the tractor adapted to prevent the rear of said units from swinging sidewise but permit free vertical movement relative to the tractor, carrying means on the rear of said mower units, the rear inner corners of said front units being flexibly connected to the front corners of said rear unit, carrying means for the front of said front units.

6. A device of the class described, comprising a tractor having front and rear carrying wheels, a power lift and a power take-off on said tractor, outer and center mower units positioned under the tractor and being flexibly connected together and to the tractor for free vertical movement over uneven ground independent of the tractor, an operating connection between said power take-off and said mower units, lifting means rotatably mounted on opposite sides of the frame of said tractor and having connections to said power lift, operating connections between said lifting means and the adjacent ends of said mower units and separate operating connections between said lifting means and the outer mower units, said separate connections being adapted to raise the outer ends of said outer units more rapidly than the other ends of the units.

7. A device of the class described, comprising a tractor having a power lift mounted on its rear end and a power take-off shaft protruding therefrom, two spaced front and a rear centrally positioned mower unit flexibly connected together for free vertical movement over uneven ground, said front units having direct pull connections to the forward end of the tractor being adapted to permit said free vertical movement, an operating connection between said power take-off and said rear mower unit and operating connections between said rear and front units, lifting shafts rotatably mounted on opposite sides of the frame of said tractor having operating connections to said power lift whereby the lifting shafts may be turned in either direction, means forming connections between said lifting shafts and said mower units, whereby the units may be lifted or lowered simultaneously.

WILLIAM F. KRENZKE.